United States Patent [19]
Migos et al.

[11] Patent Number: 6,031,529
[45] Date of Patent: Feb. 29, 2000

[54] GRAPHICS DESIGN SOFTWARE USER INTERFACE

[75] Inventors: Charles J. Migos, Montreal; Michael C. Sheasby, Longueuil; Luis Talavera, Westmount; Nicholas M. Michaud, Outremont; Daniel Langlois, Montreal, all of Canada

[73] Assignee: AVID Technology Inc., Tewksbury, Mass.

[21] Appl. No.: 08/884,356

[22] Filed: Jun. 27, 1997

Related U.S. Application Data

[60] Provisional application No. 60/041,891, Apr. 11, 1997.

[51] Int. Cl.[7] .................................................. G06F 3/00
[52] U.S. Cl. ........................ 345/340; 345/346; 345/356
[58] Field of Search .................................. 345/333, 334, 345/340, 345, 346, 348, 349, 354, 355, 356, 976, 977

[56] References Cited

U.S. PATENT DOCUMENTS

| | | | |
|---|---|---|---|
| 5,148,154 | 9/1992 | MacKay et al. ........................ | 345/340 |
| 5,526,478 | 6/1996 | Russell, Jr. et al. .................... | 707/512 |
| 5,745,096 | 4/1998 | Ludolph et al. ........................ | 345/340 |
| 5,751,286 | 5/1998 | Barber et al. ........................... | 345/348 |
| 5,758,093 | 5/1998 | Boezeman et al. ................. | 395/200.79 |

OTHER PUBLICATIONS

James D. Foley, "Computer Graphics", Addison–Wesley Publishing Company, pp. 443–446, 468, 1990.

"Systems Application Architecture", IBM, pp. 95–97, 1989.

Rich Grace, "PowerPoint 4 For Windows", QUE, pp. 359–360, 487, 584, 628 1994.

Softimage, Eddie™ Version 3.1 User's Guide, 1994.

Website: www.microsoft.com/msdn/sdk/platforms/doc/sdk/win32/win/src/windows — 18.htm, Mar. 1997.

*Primary Examiner*—Raymond J. Bayerl
*Assistant Examiner*—X. L. Bautista
*Attorney, Agent, or Firm*—Robert P. Stratfon; Omar A. Nassif; Arne I. Fors

[57] ABSTRACT

The present invention relates to method and apparatus for presenting a graphical user interface for use in displaying graphics on a computer display. A frame window is launched that includes a main menu and defines a window border that bounds a user work surface on a display monitor. A first borderless child window is attached to the frame window. This first borderless window is a graphics display window for displaying an image on the user work surface. One or more additional borderless child windows are attached to the frame window. These other child windows display controls such as buttons and icons that allow the user to control depiction of the image within the first borderless child window. The buttons and icons have a sculpted appearance that appears raised in a first state and appear reversed when 'depressed' or activated by the user.

7 Claims, 8 Drawing Sheets

GRAPHICS DESIGN SOFTWARE USER INTERFACE

This application claims benefits of Provisional Application No. 60/041,891 filed on Apr. 11, 1997.

FIELD OF THE INVENTION

The present invention concerns a user interface method and apparatus for use with graphics composition and editing software.

BACKGROUND ART

Personal computers and graphics workstations almost universally now run software in conjunction with a windows based operating system. These windows based computer operating systems include program interface functions that allow a user to define a desktop interface having a frame window that bounds a user work surface. Applications programs written for these operating systems typically attach one or more so-called child windows to the main, frame window. Each of the child windows has its own gadgets such as buttons, toolbars, etc. that control functions associated with the child windows.

One example of a windows programming standard is the multiple document interface or so called MDI standard. This standard defines a windows structure and user interface for accessing multiple documents in a single application. An MDI application defines a single client area but can contain multiple child windows. Many prior art applications programs including word processing software conform to the MDI standard.

Three dimensional graphics rendering software has become a standard tool for use in composing, editing and displaying multimedia video presentations. This software is used in business presentations and videos as well as animated cartoons and commercial movies having thrilling special effects. In creating multimedia presentations, videos can be created from an analog source such as a videotape that is digitized, edited and then reconverted to analog tape form. The source for these presentations can also be digital data from a digital CD having images that are loaded into the computer memory and edited for subsequent presentation. As the capabilities of graphics rendering software has increased, the ability to create sophisticated multimedia presentations has been an incentive for a wide variety of the users, many without a background or training in computers to use such software.

DISCLOSURE OF THE INVENTION

The invention relates to a new and improved user interface for use with imaging software such as three dimensional graphics rendering software. Use of the interface has improved the way the user interacts with the computer by improving the ergonomic, aesthetic and instinctive feel of the computer interface.

A preferred embodiment of the present invention concerns a method of presenting a graphical interface to a user for controlling functions performed by graphics imaging software. The invention includes the steps of launching a frame window that defines a window border that bounds a user work surface on a display monitor. A first borderless child window is attached to the frame window. This first borderless child window displays an image on the user work surface. The preferred method also includes the steps of attaching one or more additional borderless child windows to the frame window and displaying controls within those additional borderless child windows. The other child windows depict control gadgets the user can activate to control a manner in which the image is displayed within the first borderless child window.

Practice of the present invention avoids the cascading effect prior art software exhibits when multiple child windows are presented on a screen display. A flat display with multiple windows avoids the disruptive and potentially confusing effects caused by many child windows having borders and controls bound to a child window frame. In accordance with one embodiment of the invention the computer display includes one frame and one menu. The rest of the controls are icons or buttons that are arranged to allow the user to intuitively perform control functions. The icons and buttons are most preferably sculpted buttons having sloping borders of a unique design.

The sculpted three dimensional buttons are selected by a user to change an appearance of a graphics depiction of images within the viewing region defined by a child window. According to a preferred embodiment of the invention, the three dimensional appearance of the buttons is achieved by making the button appear to have a sloped side that increases in elevation to a plateau region when the button is not selected. When the user moves a cursor over the button the button is highlighted to prompt the user of the fact that actuating the control will cause the button to perform a function. As a cursor moves over a control its color changes and the change is typically to a lighter shade to indicate to the user which button have an effect if the user clicks with the cursor control.

When the button is selected the raised button becomes a depressed button with sides or borders that slope inwardly to a center region of the button that appears to be lower in elevation that the outer portions of the button. As was the case of the unselected button the sloping is achieved by appropriate shading of the button to illustrate this depressed state.

The user interface presents a distinctive view that is pleasant to use and even could be called exciting. Working with the user interface allows the user to draw on instinctive past work surfaces; because it simulates a real physical environment, the user's common sense reactions to push or drag the interface are accurate. A unique stippled rubber texture, unique among user interfaces, compels the user to slide the surface, resulting in a scrolling action.

Prior art buttons are depicted as three dimensions with sloped sides having a flat surface that show a changed state when depressed. The buttons constructed in accordance with the present invention are seamlessly molded into the desktop as part of the desktop. The user perceives the desktop as viewed on the screen as a physical entity that is rubbery or translucent.

The user interface is a single contiguous surface where the tools 'grow' from the surface and thereby enhance the sense of realism. The buttons can be highlighted when required (for example, during 'rollover highlighting'); this effect conveys the impression that the buttons are a thin membrane over a physical light that has been mounted into the desktop.

One further aspect of this user interface is the appearance of data in the 'holes' in the surface. If a given control represents some form of user-editable data, such as a numeric value or text string, then the control appears to consist of a hole punched into the surface of the otherwise continuous surface, revealing a darker shaded material beneath. The data that the user enters resides on the 'substrate'.

The above and other features provide a clean, flat (non-overlapping) space that allow the user to concentrate on his or her data. Use of neutral colors keep the user's eye neutral which enhances the performance of sensitive tasks such as color correction with paint. A somewhat subtle advantage is the ability of the user to stare at the display for hours at a time with less eye strain.

As seen in the drawings, the aesthetic advantage is striking. The screen will be seen by artistic people looking over the shoulder of the user of the software. It is advantageous to have these non-users have a positive impression of the software since they may be paying for its use.

The above and other objects advantages and features of the invention will be better understood from a detailed description of a preferred embodiment of the invention which is described in conjunction with the accompanying drawings.

BEST MODE FOR PRACTICING THE INVENTION

Figure 1:
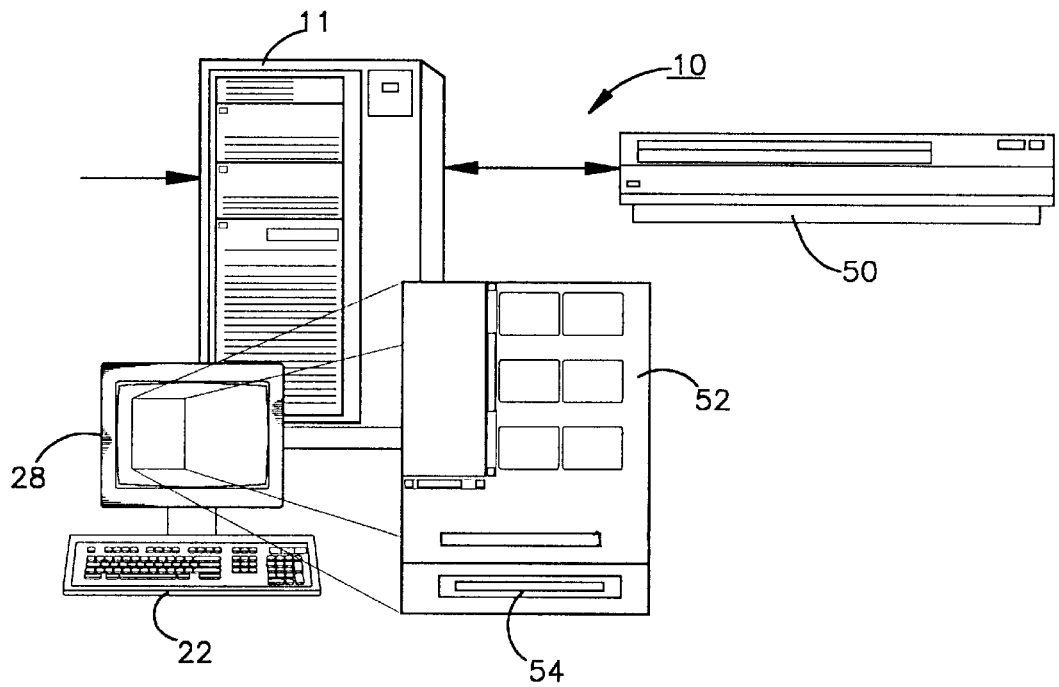
FIG. 1 is an overview of a computer system suitable for rendering display images in accordance with the present invention.
Figure 2:
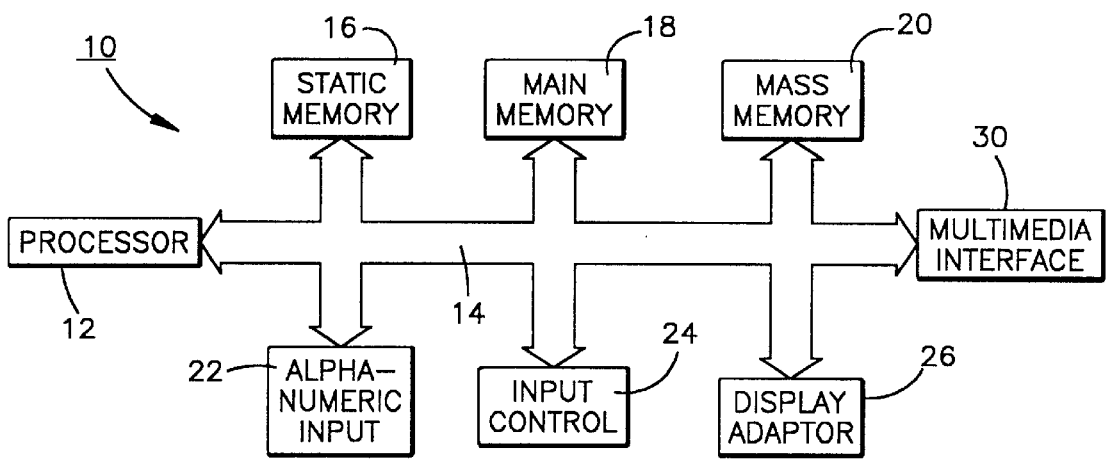
FIG. 2 is a schematic representation of the FIG. 1 computer system.

A computer graphics imaging system 10 for use with the present invention is schematically depicted in FIGS. 1 and 2. The graphics imaging system 10 includes a computer 11 that has a processor 12, a system bus 14, a static memory 16, a main memory 18, a mass memory 20, an alphanumeric input device 22, an control device 24 for manipulating a cursor, and a display adapter 26 for coupling video control signals to a video display 28 such as a computer monitor. Since the graphics imaging system 10 is particularly suited to high resolution, high speed graphics imaging the display or monitor 28 is most preferably a high resolution wide screen display.

The processor 12 executes imaging software described below to allow the system 10 to render high quality graphics images on the monitor 28. The processor 12 comprises a suitable processing device such as a microprocessor, for example, and may comprise a plurality of suitable processing devices. The processor 12 executes instructions stored in the static memory 16, main memory 18, and/or mass memory 20.

The static memory 16 may comprise read only memory (ROM) or any other suitable memory device. The static memory 16 may store, for example, a boot program for execution by the processor 12 to initialize the data processing system 10. The main memory 18 may comprise random access memory (RAM) or any other suitable memory device. The mass memory 20 may include a hard disk device, a floppy disk, an optical disk, a flash memory device, a file server device, or any other suitable memory device. For this detailed description, the term memory comprises a single memory device and any combination of suitable memory devices for the storage of data and instructions.

The system bus 14 provides for the transfer of digital information between the hardware devices of the data processing system 10. The processor 12 also receives data over the system bus 14 that is input by a user through the alphanumeric input device 22 and/or the cursor control device 24. The alphanumeric input device 22 may comprise a keyboard, for example, that comprises alphanumeric keys. The alphanumeric input device 22 may comprise other suitable keys, comprising function keys for example. The cursor control device 24 may comprise a mouse, touch tablet, track-ball, and/or joystick, for example, for controlling the movement of a cursor displayed on the computer display 28.

The FIG. 1 data processing system 10 also includes display adapter hardware 26 that may be implemented as a circuit that interfaces with the bus 14 for facilitating rendering of images on the computer display 28. The display adapter hardware 26 may, for example, be implemented with a special graphics processor printed circuit board including dedicated random access memory that helps speed the rendering of high resolution, color images on a viewing screen of the display 28.

The display 28 may comprise a cathode ray tube (CRT) or a liquid crystal display (LCD) particularly suited for displaying graphics on its viewing screen. The invention can be implemented using high speed graphics workstations as well as personal computers having one or more high speed processors.

Imaging Software

The graphics imaging system 10 utilizes specialized graphics software particularly suited to take advantage of the imaging hardware included in the display system 10 depicted in FIGS. 1 and 2. The software integrates nonlinear editing, compositing, audio mixing, and graphics design suites which are used to create multimedia presentations. Source material for use with such a system can be obtained from a media storage device 50 that can include videotape, film reel, and digital recorded video disks. The source material can also be in the form of already digitized materials stored on a computer memory 20 such as computer-generated animations, graphic images or video files stored on a large capacity hard or fixed disk storage. To utilize the source images from the media storage 50, the system 10 includes a multi-media interface 30 for converting image data into a form suitable for use by the software executing on the processor 12 and display adapter 26. A representative display produced by the graphics software (FIG. 1) presents multiple images 52 of different resolutions. A time line control 54 beneath these multiple images allows the user to select from a video clip of many such images.

Software for implementing the disclosed imaging system 10 runs under a windows based operating system such as Windows NT commercially available from Microsoft Corporation. The graphics imaging software is written in an applications programming language suitable for writing windows applications programs. The presently preferred embodiment of the invention was written in C++ using the visual C++ programming tools including the Microsoft Foundation Class library.

User Interface

Figure 3:
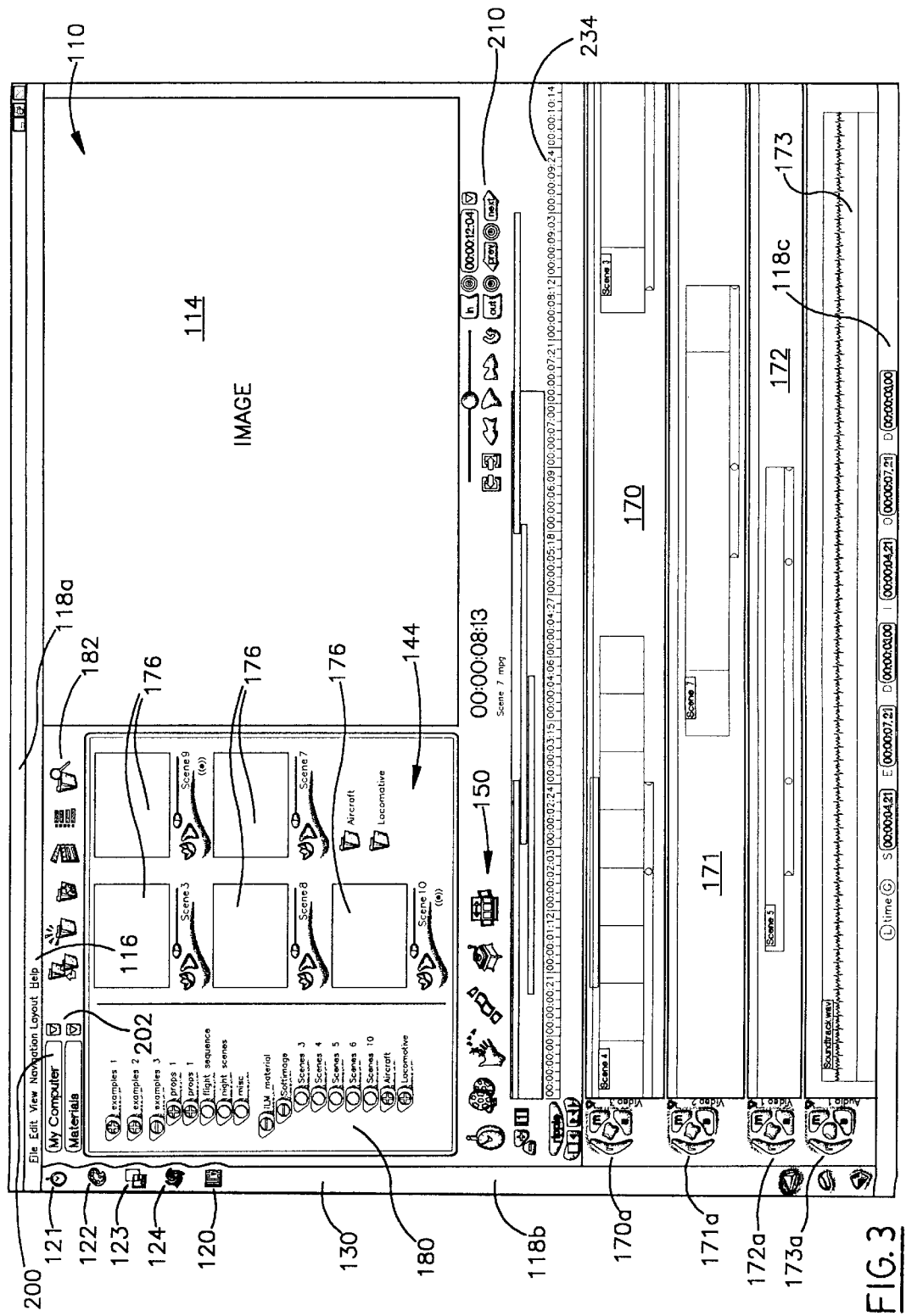
FIGS. 3, 4, 5, 6, 7, 8, 9, 10, 11, 12, and 13 are alternate schematic depictions of display screens and portions of those display screens.
Figure 14:
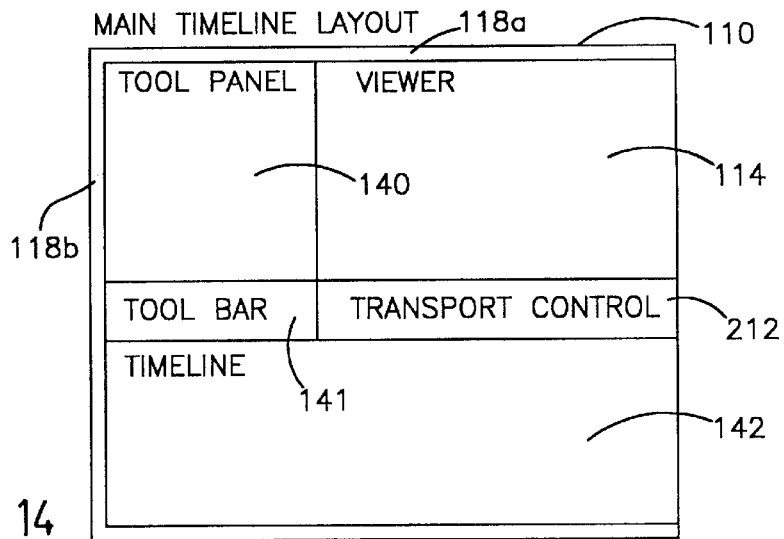
FIGS. 14–16 are schematic depictions of outlines of child windows within a frame window.

FIG. 3 are examples of a presently preferred graphical user interface that allows the user to control a presentation of graphic images on the computer display 28. An alternate depiction of the same view of the user interface is depicted in FIG. 14. In this alternate depiction the shading and icons have been removed to show a layout or organization of multiple child windows that are attached to a main frame window.

The FIG. 3 depiction includes a frame window 110 that by default takes up the entire viewing area of the computer monitor 28. This frame window 110 defines a user work area. The frame window 110 and various child windows that are described below are created using the windows NT operating system running in conjunction with the presentation software.

A first borderless child window 114 is attached to the frame window 110. As seen in FIG. 3, graphics images are displayed in this first borderless child window 114 within the user work surface defined by the frame window 110. One or more additional borderless child windows are attached to the frame window. These additional child windows display controls within the user work surface that allow the user to control depiction of the image within the first borderless child window 114. Use of these borderless child windows reduces the need by the user to manage the windows.

The FIG. 3 depiction has associated with it aesthetic features that are achieved through a combination of windows programming techniques and graphic design of the control elements that appear on the display. There is a single menu 116 at the top of the frame window 110 that does not disrupt the user workspace and does not create other potentially confusing borders. The controls that dictate the graphics rendering within the window 110 are depicted on a 'flat' background that abuts three sides 118a, 118b, 118c of the frame window 110.

Figure 4:
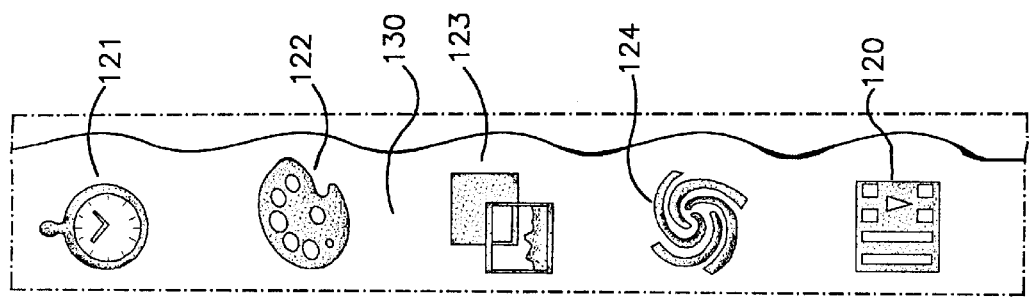

Located to one side of this 'flat' background are a set of icons that control which task of a possible number of tasks the user can select via the user interface. By selecting on or 'clicking' with the cursor control 24 a different suite of controls is presented. In accordance with a presently preferred embodiment of the present invention there are five different icons 120–124 (FIG. 4) that the user can actuate and which in combination form a task bar. A first media management icon 120 allows the user to capture source material and output results to a storage media via the media interface 30. A second editing icon 121 is for use in editing audio and video clips that have been retrieved from the storage media or from digital storage. A third graphics icon 122 is used to modify images using the graphics rendering tools such as adding paintbrush strokes and text through use of a drawing or titling tool. A compositing icon 123 is used to compose graphic images from multiple sources either stored in digital or in analog form and converted to digital form. Finally, the user interface includes an audio icon 124 that allows editing and playback of audio clips that can be co-ordinated with multi-media visual images to produce a final multi-media product for producing both sound and video.

A background region 130 for the task icons 120-124 is painted with a first shade of a neutral color in response to a WM_PAINT message received by the frame window. As shown in FIG. 14, abutting the background region 130 of the task bar icons are three child windows 140–142 having a background painted with a second neutral shade of the same color that defines the background 130 of the task bar. A first 140 of these three child windows defines a console region 144 that includes a number of different user controls that vary depending upon the software suite the user chooses by clicking on a selected task icons 120–124. By comparing the FIG. 3 depiction with that of FIG. 14 one sees that in FIG. 3 there are no visible borders between the three child windows, i.e. they are borderless child windows.

In accordance with a preferred embodiment of the present invention the console region 144 has a grey background. The gray background is painted with RGB components of Red 171, Green 168 and Blue 166 out of 255 maximum.

A child window 141 (FIG. 14) defines a console toolbar region 150 that allows the user to access the various toolsets available in a given suite. The suite depicted in FIG. 3 is the editing suite where the user can perform editing tasks. In this mode the user can depict multiple video clips acquired from the media 50 within an additional child window 142 located directly beneath the console toolbar window 141. In the editing mode the user may then apply transitions and effects to the clips in the timeline as well as trim, move, roll, slip and synchronize the video clips.

Figure 5:
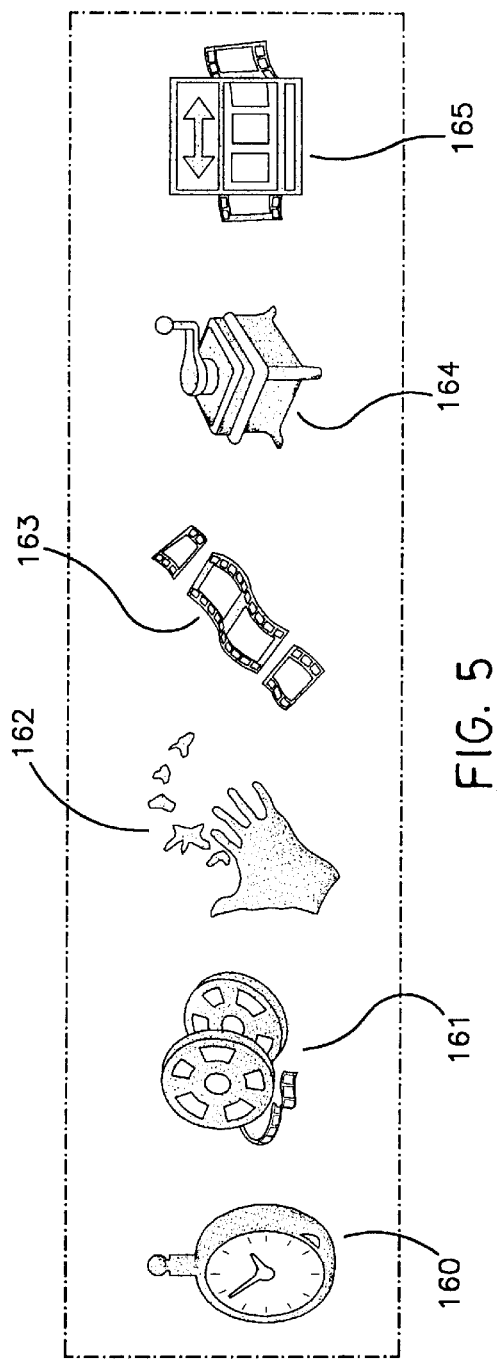

When in the editing mode, the icons that extend across the control panel 140 allows the user to access different toolsets used in the editing suite. Choice of a different icon in the toolbar will cause a different toolset to be displayed inside the console region 144. The icons depicted in the FIG. 3 toolbar are an editing icon 160, a browser icon 161, an effects icon 162, a trim icon 163, a mixer icon 164, and a slip/roll icon 165. An enlarged depiction of these icons is illustrated in FIG. 5. A given workspace can have a large number of tools available. It is a design criteria of the disclosed tool layout that the tools be accessible as fast as possible. It is deemed advisable not to 'hide' tools in hierarchical access schemes such as contextual menus that change depending on which window is active. Making the tool readily available makes it easier for novice users to accomplish results. Even experts will not remember where less frequently used tools are hidden.

The choice to make tools visible requires maximizing a fixed amount of space on the display in as efficient manner as possible. The disclosed interfaces have three ranges of tools. So called foreground tools are visible all the time and thus 'own' part of the user desktop. A middle range of tools are used occasionally and can share space with other tools. A third set of tools is used relatively infrequently and can appear transiently, over other data, or hidden in menus.

The control panel 140 typically addresses the middle ground of control. It contains tools such as the browser depicted in FIG. 3. The panel collects a set of tools together so that the user can re-use part of his desktop, sharing it between tools which are used occasionally and mutually exclusive with other elements of the desktop.

Figure 8:
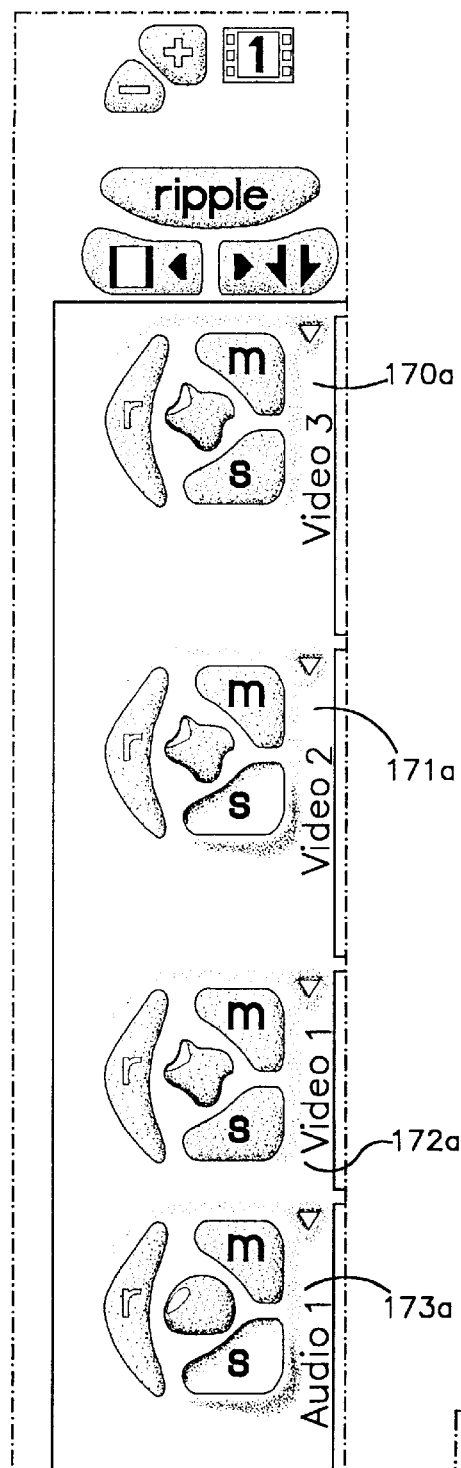

FIG. 3 illustrates multiple timelines or tracks 170–173 that extend across the width of the screen. These three timelines illustrate multiple graphic images and also a graphical depiction of a sound file that is included in the multi-media output from the multimedia system 10. On a right-hand side of the window 142 track controls 170a, 171a, 172a, 173a allow the user to control the behavior of the tracks 170–173. There are two types of track controls, one for video and one for audio. Each control (FIG. 8) has a ripple, mute, solo and height button a scroll area and a jewel to indicate the track type. The height control adjusts the track height to different levels. The ripple button sets the ripple mode on or off for the track. The mute turns off a sound track and turns off a view of all clips on a video track. The sole button allows the user to play the contents of a selected track.

Figure 7:
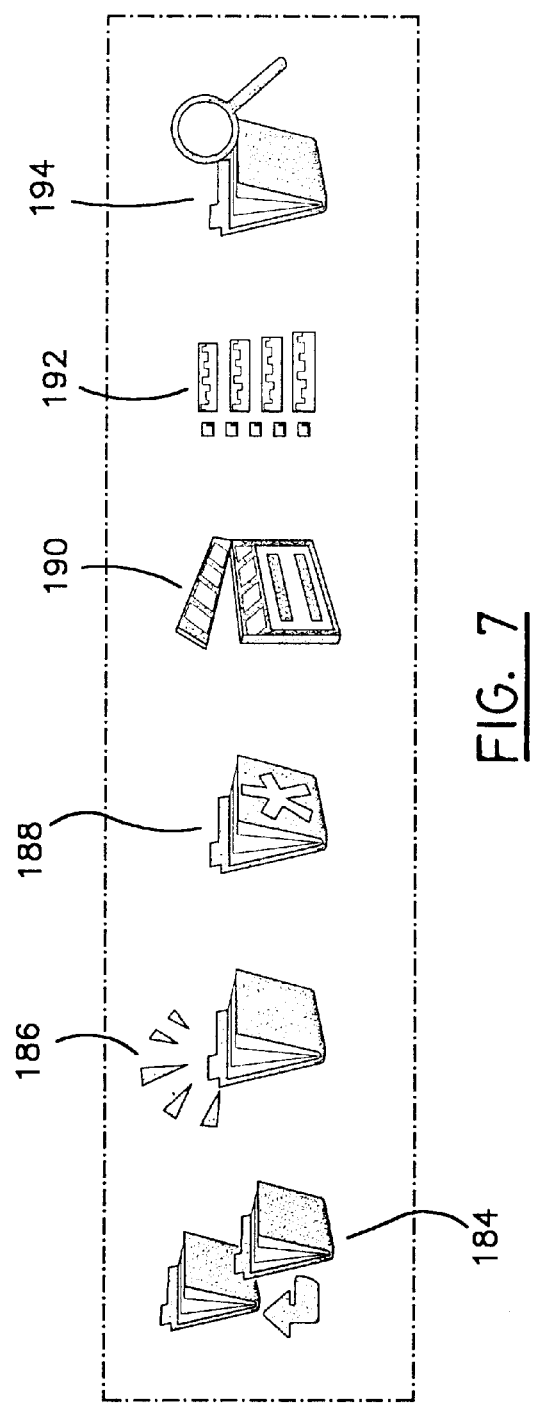

Located within the console region of the user interface are a number of images 176 that are loaded from disk with the help of the browser. A browser region 180 of the console region 144 is located to the left of the images 176. The browser facilitates file management tasks such as moving, copying and renaming clips, as well as deleting clips and the media files they represent. A browser toolbar 182 above the images 176 includes a number of icons that are displayed in response to a user actuating the browser icon 161 in the console toolbar. The icons are schematically depicted in FIG. 7 and include an up icon 184, a new folder icon 186, a new favorite icon 188, a thumbnail view icon 190, a details icon 192 and a finder icon 194. To the left of the browser toolbar 182 are displayed folder and file text windows 200 and pulldown arrows 202 for displaying others files and folders.

Figure 6:
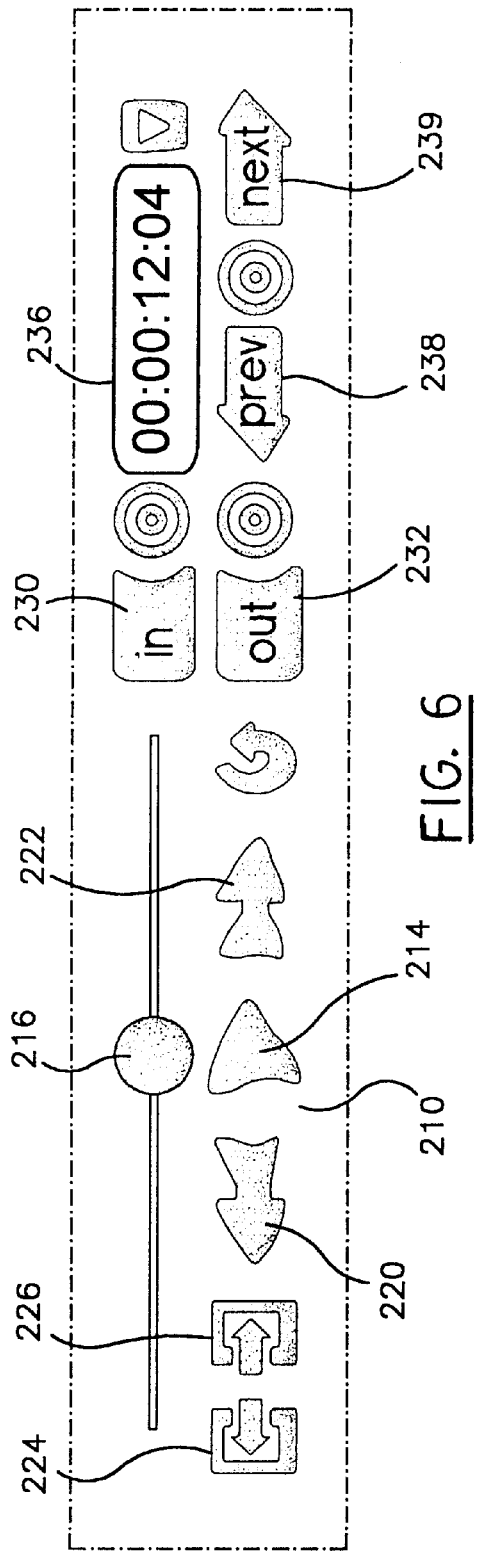

Directly beneath the image area within the first borderless window 114 is a transport control 210 positioned within an additional child window 212. The transport controls are used to preview the media in the viewer or to play segments that have been edited. The transport control 210 also allows the user to control DAT decks, Betacam decks and MIDI instruments . A play/stop button 214 (FIG. 6) toggles between play and stop. A shuttle slider 216 moves a clip back and forth along a track. Go to head and go to tail controls 220, 222 cause the viewer to go the head and end of a track. A frame forward and frame back control 224, 226 advance and retract one frame at a time. A mark in and a mark out button 230, 232 allow marks to be set on a timeline 234 beneath the tracks. A textbox 236 allows the user to set a specified frame and previous and next buttons 238, 239 allow the user to go to marker points set previously. By clicking on these buttons the user advances and rewinds images depicted within the tracks and the sofware updates the image within the first borderless child window 114 to depict an appropriate image.

Figures 12, 13:
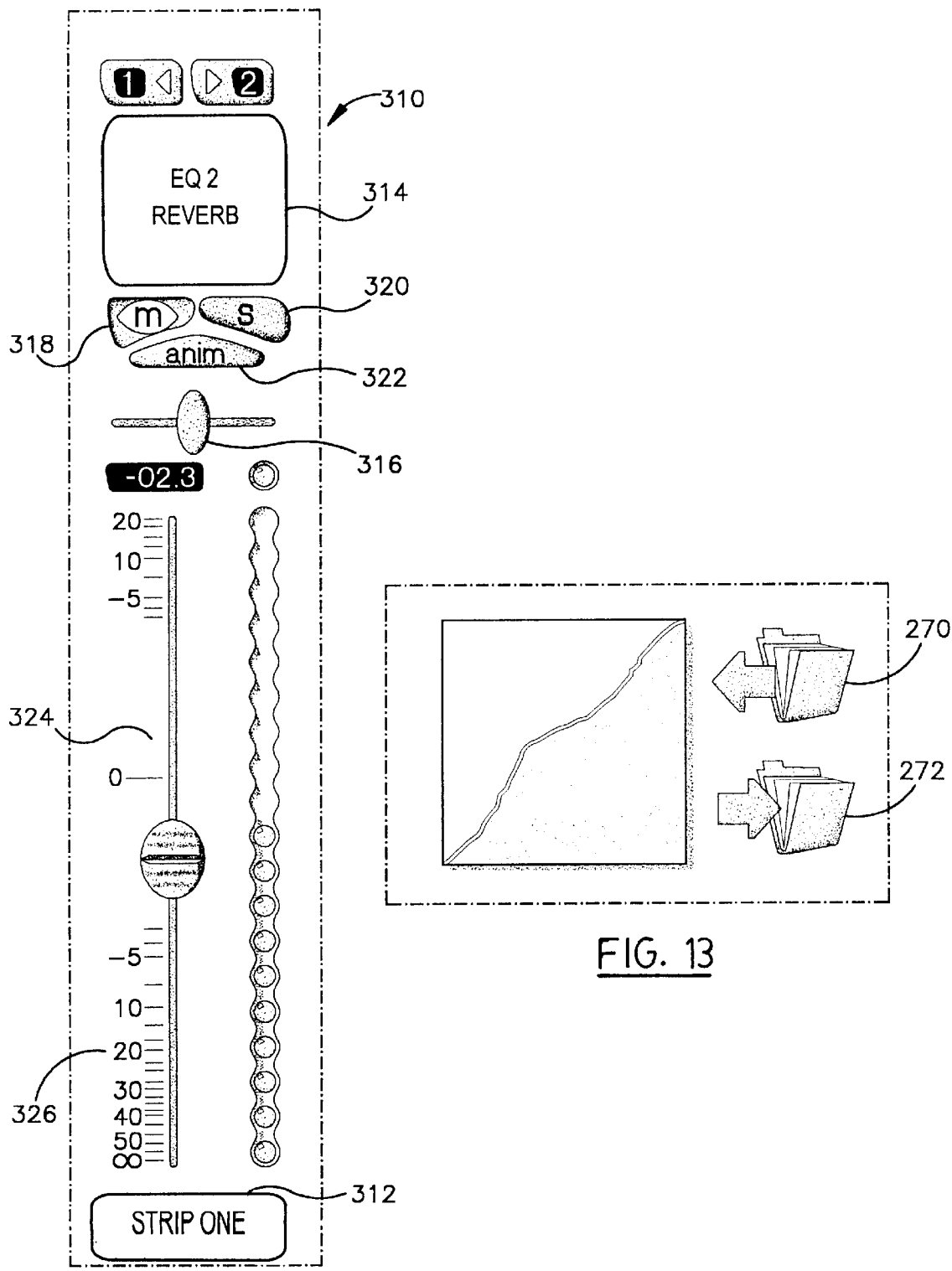

A property inspector window is opened in response to user actuation of an icon on a flat work surface. The inspector is rendered in a floating window that covers the flat work surface and which can be moved by clicking on its title bar and dragging it to an appropriate part of the display. A part of the floating window is shown in FIG. 13 illustrating a load icon 270 and a save icon 272. These icons load and save property pre-sets or attributes to and from disk that relate to the property that is being edited.

Figure 9:
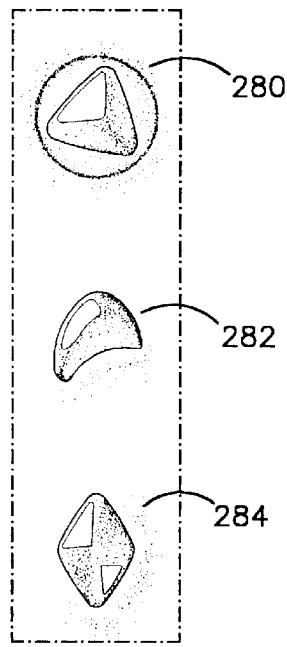
Figure 10:
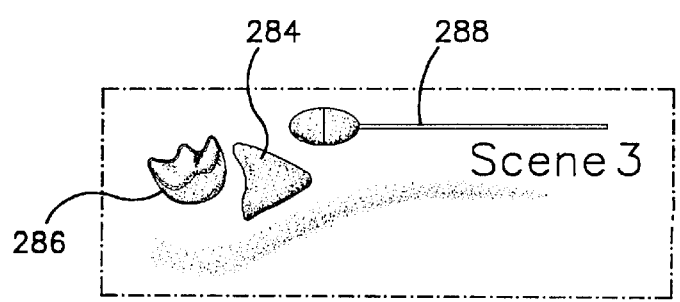

FIGS. 9–12 illustrate other controls for use in controlling the presentation of software within the viewing area. In FIG. 9 three 'jewels' are presented which are visible in the lower left corner of FIG. 3. These jewels represent the type of media contained in a container clip. A top jewel icon 280 represents a non-linear editing container clip. A second jewel icon represents an audio container clip and a bottom jewel icon represents a paint container clip. FIG. 10 represents an array of controls associated with one image that forms a part of a clip on the track 170 of FIG. 3. The array has a forward button 284, a jewel 286 and a slider 288.

Figure 11:
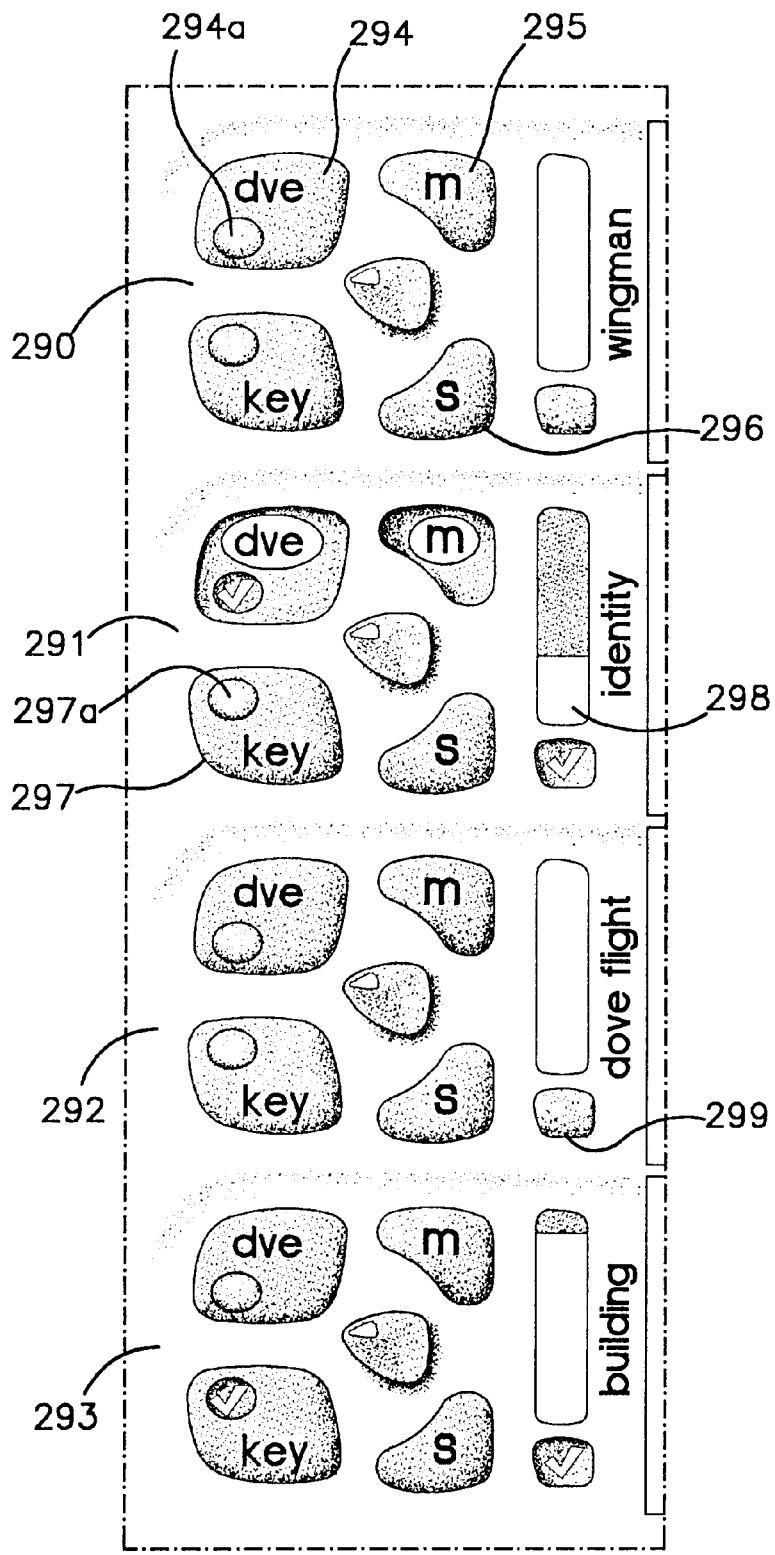

FIG. 11 represents a part of a layer console child window that is displayed when the compositing icon 123 is chosen in the task bar. The viewer window 114 displays a composited image at the current position of the a play cursor. To view the composite at different location in a clip, the user uses the transport controls beneath the viewer window 114.

The layer console allows the user to determine a top-down hierarchy in which layers are composited. Each of four layer controls 290–293 shown in FIG. 11 allows the user to define how that layer reveals underlying layers. A dve control 294 allows a dve to be defined and applied to a track. A checkbox 294a allows the user to apply a predefined dve. A mute button 295 allows the user to turn off a view of a layer. In the composite viewer 114 the composite is rebuilt without the muted layer. A solo button 296 displays a single layer in the viewer 114. A key button 297 allows one to define a chrominance or luminance key and apply that key to a track and a checkbox 297a applies a predefined key. An opacity slider 298 allows the user to vary the transparency of a track and a matte expand button 299 allows the user to display or hide the external mattes which are combined to form a layer's matte.

Turning to FIG. 12, this figure depicts one mixer control 310 in a mixer console window. Audio mixing is accessed by actuating the audio icon 124 in the task bar. Audio mixer controls appear side by side as the user adds audio tracts to a timeline. A strip name appears in a strip name text box 312. An effects box 314 allows the user to apply an effect to the whole track. A pan slider 316 controls a distribution of an audio signal to output (left and right speaker) and by moving the slider to the left and right control the distribution. A mute button 318 turns the sound off for the strip while the segment is displayed. A sole button 320 plays a selected strip. An animation button 322 records adjustments made on the mixer as the segment is played. The user can animate the volume, pan and mute controls. A fader slider 324 controls the output volume on a vu meter 326.

Figure 15:
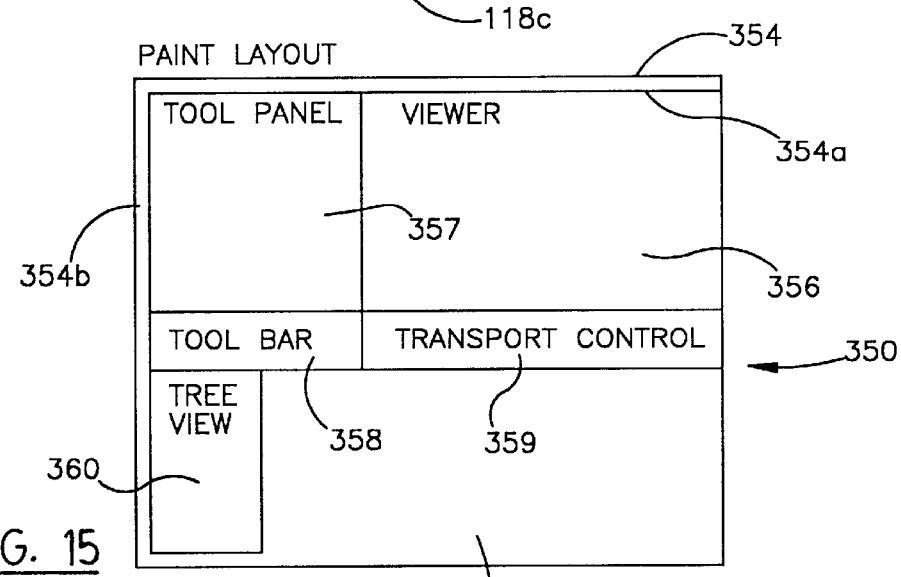
Figure 16:
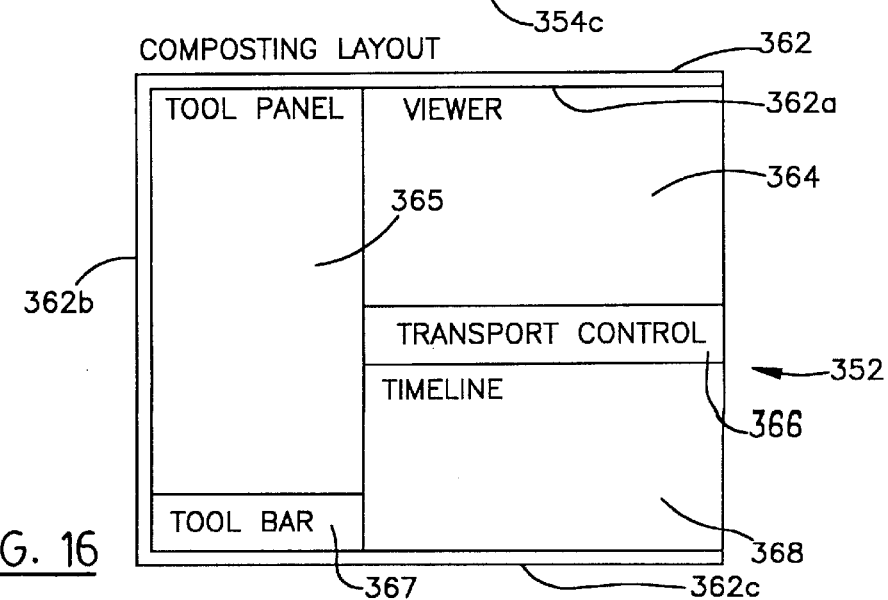

Other suites that are accessed by means of the task bar organize the windows in other ways and two alternate frame window/child window arrangements 350, 352 are illustrated in FIGS. 15 and 16. In the arrangement of FIG. 15 a frame window 354 includes portions 354a, 354b, 354c containing five borderless child windows 356–360. This depiction is representative of a child window layout for use in a paint suite of tools provided by the presentation software. The window arrangement 352 of FIG. 16 includes a frame window 362 including portions 362a, 362b, 362c bordering five borderless child windows 364–368.

A common feature of each of the user interfaces disclosed in the Figures is the controlling of the graphics depiction within the child window 114 by actuation of the contoured three-dimensional appearing buttons that are displayed with the regions of the work area depicted in the one or more additional child windows. The icons next to the tracks or contained within the transport window, for example, has three dimensional buttons that can be selected by a user to change an appearance of a graphics depiction of images within the viewing region defined by the child window 114. The three dimensional appearance of the buttons is achieved by making the button appear to have a sloped side that increases in elevation to a plateau region when the button is not selected. When the user moves the cursor by means of the control 24 over the button the button is highlighted to prompt the user of the fact that actuating the control 24 will cause the button to perform a function. As a cursor moves over a control its color changes and the change is typically to a lighter shade to indicate to the user which button have an effect if the user clicks with the cursor control. When the button is selected the raised button becomes a depressed button with sides or borders that slope inwardly to a center region of the button that appears to be lower in elevation that the outer portions of the button. As was the case of the unselected button the sloping is achieved by appropriate shading of the button to illustrate this depressed state.

User Interface Implementation

The arrangement of frame and child windows is implemented using Windows NT interface functions. The implementation of a frame window and multiple non-overlapped child, borderless windows is made easier by the application framework provided by the Visual C++ programming environment. The present user interface is implemented as a number of COM (component object model) objects having interfaces that are accessed by the multimedia presentation sofware. The term 'multimedia presentation software' and 'presentation framework' are used interchangeably in the description of the user interface implementation.

In accordance with a preferred embodiment of the present invention child windows are implemented by means of COM objects that expose an IDSView interface so that the presentation framework can use the object. As a starting point the COM object that exposes the interface must be registered using helper functions that are called to register that object in the Windows NT registry.

Child windows can be registered as part of a flat view, a floating view or a panel view. Windows registered as part of the flat view form part of the flat user interface discussed above. There are two helper functions that allow the child window object to be registered and unregistered. These functions are of the form: (1) HRESULT DSRegisterFlatView (REFCLSID in_ViewCLSID, LPCTSR in_szViewName, int i_MaxViewInstance); and (2) HRESULT DSUnRegisterFlatView (REFCLSID in_ViewCLSID). The first parameter to the helper function DSRegisterFlatView is a class Identifier for the object that the helping function is registering. Once the object is registered the presentation framework can access the functions provided by the object. The second parameter in the registering function is a pointer to a string that is the readable name of the object or in the instance of a child window the readable name of the window. The third parameter to the helper function is an integer indicating the maximum number of instances of this object that are allowed. The second helper function is used to unregister an object. Similar helper functions exist for floating and panel windows.

The implementer of the object writes code for the interface that determines the manner in which the child window appears on the display. A process of creating a new interface is performed by starting a new project (in visual C++ for example) and creating a DLL that exposes the interface to the presentation framework. Once this object is created, it is registered and once it is registered it becomes available as a part of the user interface. The act of adding the object and its window to the interface can be performed under user control or alternately can be part of an initialization process at runtime by the presentation framework.

The following interface declaration and the definition of the declared functions must be part of the interface (DLL) in order for the presentation framework to make use of the object.

sentation framework either at startup of the framework or in response to the user actuation of a command with the cursor control 24. Turning to FIG. 3 one sees that one of the menu items displayed by the frame window 110 is a 'Layout' menu item. If the user chooses this menu item, a submenu item 'edit' is displayed. The edit command in turn allows the user to choose from a number of named objects that implement child windows. These objects can be deleted and substituted to customize the user interface to the user's taste. A separate command that is actuated under the 'Layout' menu and edit submenu commands allows the user to see the dimensions of the multiple child windows that are used to achieve the disclosed graphical interface. These dimensions are displayed as white lines between the confines of the child windows that are presented by the frame window's paint procedure. The user can display these boundaries and then resize the child windows by clicking on the boundary between two child windows and dragging the boundary. The parent frame window then resizes the child windows in an appropriate manner to implement the user's resizing request.

The first parameter the presentation framework provides to the 'Init' function is its own window handle. (See Petzold, Programming Windows 95 for a discussion of Window Handles, there is also a discussion in chapter 20 of COM programming and this chapter is incorporated herein by reference) A second parameter is presently not used. Access to the parent window handle allows the Init code to attach a child window to the parent window. This window will occupy a well defined region of the user interface and implement its control functions and rendering by responding to WM_PAINT messages and reporting mouse movements and mouse clicks to the parent frame window which will evaluate those messages.

The next function accessible by the presentation framework is the 'Term' function which allows the framework to close a view. This function takes as a parameter a pointer to the interface that is obtained by the QueryInterface function. The 'Term' function releases resources used by the interface

```
DECLARE_INTERFACE_(IDSView,IUnknown)
{
/////////////////////////////////////////////////
//      Iunknown methods        //
        STDMETHOD(QueryInterface)(THIS_REFIID LPVOID FAR*) PURE;
        STDMETHOD_(ULONG, AddRef) (THIS) PURE;
        STDMETHOD_(ULONG, Release) (THIS) PURE;
/////////////////////////////////////////////////
        // Interface Specific Methods
/////////////////////////////////////////////////
        STDMETHOD(Init)(THIS_HWND, DSVIEWTYPE) PURE;
        STDMETHOD(Term)(THIS) PURE;
        STDMETHOD(State)(THIS_DSVIEW_STATE) PURE;
        STDMETHOD(GetGlobalProperties)(THIS_LPSTREAM) PURE;
        STDMETHOD(SetGlobalProperties)(THIS_LPSTREAM) PURE;
        STDMETHOD(GetLayoutProperties)(THIS_LPSTREAM) PURE;
        STDMETHOD(SetLayoutProperties)(THIS_LPSTREAM) PURE;
};
/////////////////////////////////////////////////////////////////////////////
```

The first three interface methods are standard methods that allow the object interface methods to be used by the presentation framework. The QueryInterface method returns a pointer to an entry point of the code (DLL) that implements the interface. The AddRef and Release functions keep track of the instances of the object that are accessed by the presentation framework.

The other functions that must be implemented perform specialized tasks. The 'Init' function is called by the prebefore the framework removes the object by means of the Release method.

The State method allows the framework to inform the object that a change of the state has been made. For example the framework can inform the object that the object has lost focus or is minimized or maximized. The parameter to the State function is one of an enumerated list of possible states for the object.

The two related functions of Get and Set GlobalProperties are used to cause the interface object to read and write to a stream such as a disk storage or memory. In response to Set Globalproperties command the interface saves certain parameters that are characteristic of the object. Representative examples of a use of this function would be to save a background color or a font size.

The SetLayoutProperties and Get LayoutProperties are subsets of the Global properties. The layout properties are properties that switch across child boundaries as opposed to a global property which could be set to be common for all child windows. As an example the user may which to set up default grids for use with the viewing child window 114 that depend on the suite being used. A paint image and a non-linear editing image might require different grids and the user can set up these grids for different suites using the Set and Get LayoutProperties.

While a preferred embodiment of the invention has been described with a degree of particularity, it is the intent that the invention include all modifications and alterations from the disclosed design falling within the spirit or scope of the appended claims.

We claim:

1. A method of presenting a graphical user interface on a computer display monitor comprising the steps of:
    a) launching a frame window having a window border that bounds a user work surface on a computer display monitor;
    b) attaching a first borderless child window to the frame window wherein the first borderless child window comprises a graphics display window for displaying an image on the user work surface;
    c) attaching one or more additional borderless child windows to the frame window within regions of the user work surface not occupied by the first borderless child window and displaying controls within said one or more additional borderless child windows that allow the user to control depiction of the image within the graphics display window;
    d) displaying to a user temporarily visible boundaries between the first and one or more additional borderless child windows; and
    e) allowing the user to resize at least one borderless child window and then remove the temporarily visible boundaries from view.

2. The method of claim 1 wherein the first and one or more additional borderless child windows abut each other along a common boundary.

3. The method of claim 2 wherein the first and one or more additional borderless child windows fill the work surface bounded by the frame window.

4. The method of claim 1 wherein the at least some of the controls within the one or more additional child borderless windows are displayed as images of contoured three dimensional buttons having sloped sides that are rendered with shading to depict the sloped sides.

5. The method of claim 4 wherein the graphics depiction within the first borderless child window is controlled by actuating the contoured three-dimensional buttons that are displayed with the regions of the work area bounded by the one or more additional borderless child windows.

6. The method of claim 1 additionally comprising the step of displaying a row of visible icons that make up a tool bar that can be selected by a user to change an appearance of a portion of the display that allows the user to control the display of images within the multiple borderless windows of the work surface.

7. Apparatus for controlling depiction of a graphics image in software comprising:
    a) a video display monitor having an input for receiving control signals for rendering a graphics image on the display monitor; and
    b) a computer for generating the control signals for rendering the graphics image on the monitor and a processor for causing the control signals to present a frame window that defines window border bounding a user work surface on a display monitor;
    c) said processor executing software for attaching a first borderless child window to the frame window wherein the first borderless child window is a graphics display window for displaying an image on the user work surface and further wherein the processor attaches one or more additional borderless child windows to the frame window and displays controls within said one or more additional borderless child windows that allow the user to control depiction of an image within the first borderless child windows and wherein the processor displays to a user temporarily visible boundaries user between the first and one or more additional borderless child windows and allows the user to resize at least one borderless child window and the removes the temporarily visible boundaries from view.

* * * * *